United States Patent [19]

Palumbo

[11] 4,099,243
[45] Jul. 4, 1978

[54] MEMORY BLOCK PROTECTION APPARATUS

[75] Inventor: Benedict A. Palumbo, Phoenix, Ariz.

[73] Assignee: Honeywell Information Systems Inc., Phoenix, Ariz.

[21] Appl. No.: 760,299

[22] Filed: Jan. 18, 1977

[51] Int. Cl.² .................... G06F 9/18; G06F 13/00
[52] U.S. Cl. ........................................... 364/200
[58] Field of Search ... 364/200 MS File, 900 MS File

[56] References Cited

U.S. PATENT DOCUMENTS

| 3,328,768 | 6/1967 | Amdahl et al. | 364/200 |
| 3,377,624 | 4/1968 | Nelson et al. | 364/200 |
| 3,562,717 | 2/1971 | Harmon et al. | 364/200 |
| 3,573,736 | 4/1971 | Schlaeppi | 364/200 |
| 3,742,458 | 6/1973 | Inoue et al. | 364/200 |
| 3,828,327 | 8/1974 | Berglund et al. | 364/200 |
| 3,845,425 | 10/1974 | Clements et al. | 364/200 |
| 3,858,182 | 12/1974 | Delagi et al. | 364/200 |
| 3,893,084 | 7/1975 | Kotok et al. | 364/200 |
| 3,997,875 | 12/1976 | Broeren | 364/200 |

Primary Examiner—Melvin B. Chapnick
Attorney, Agent, or Firm—Vincent B. Ingrassia; William W. Holloway, Jr.; Ronald T. Reiling

[57] ABSTRACT

Data stored in a selected block of a memory associated with a data processing system is protected while a first device has access to any memory location in the selected memory block. If another device seeks access to the selected block of memory for the purpose of performing one or more predetermined unique sequences of operation while the first device is carrying any of such operations with respect to the selected memory block, the other device is locked out by means of a signal instructing it to abort the operation for which access is sought. Upon completion of the operation sequence by the first device, the selected memory block is unlocked and access is again available to any device. Further, a device addressing a location of memory for the purpose of carrying out one of a plurality of predetermined unique sequences is informed of the occurrence of events of significance to it by forcing an address register to a predetermined memory location comprised of a plurality of interrupt cells. During this process, other devices are denied access to the interrupt cells.

1 Claim, 1 Drawing Figure

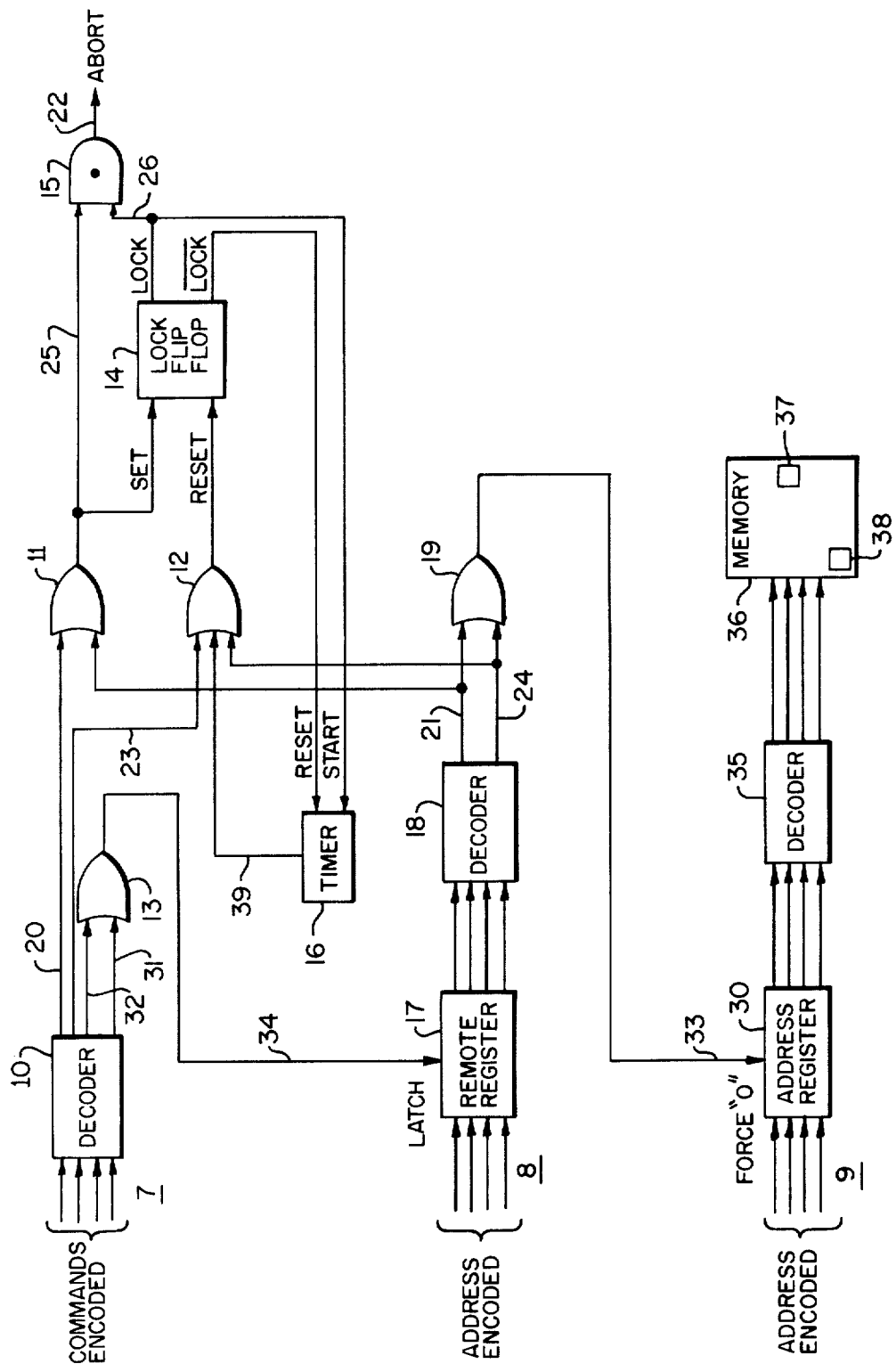

MEMORY BLOCK PROTECTION APPARATUS

CROSS-REFERENCE TO RELATED APPLICATIONS

This application is related to U.S. patent application, Ser. No. 760,473, filed Jan. 18, 1977, entitled "Apparatus and Method for Data Transfer," assigned to the assignee of the present invention and U.S. patent application, Ser. No. 760,474, filed Jan. 18, 1977, entitled "Apparatus and Method for the Transfer of Data Characters" assigned to the assignee of the present invention.

BACKGROUND OF THE INVENTION

In a general purpose data processing system where a number of devices, such as central processing units, have access at various times to the main memory associated with the system, it is desirable to avoid situations wherein two devices are simultaneously granted access to the same specified memory location or even to the same block of memory, for purposes of carrying out therein certain unique sequences of operation. For example, a commonly encountered unique operational sequence is referred to as a read-alter-write operation and it involves reading data out of a specified memory location located within a selected memory block, processing the data read out, and writing the processed (altered) data back into the specified memory location. Thus, it is important that another device of the data processing system, e.g., another CPU, not have access to the selected block of memory of the specified memory location during the interval when a first CPU holds access.

The main memory of a data processing system may also be employed for other types of operation, e.g., for the purpose of providing notification of the occurrence of a significant event. For example, if a data processing device, such as a disk drive, terminates a particular operation, the occurrence of that event may be of significance to a number of other devices of the data processing system. Thus, a previously specified location of the memory may be used to give notice of the occurrence of that event to all devices seeking access to the memory.

For example, the "0" memory location (least significant location) may conveniently be employed for that purpose. Any device having need of the information contained in the respective cells at the "0" memory location, will read the contents of the cells to determine whether or not they apply to the operation the inquiring device is to carry out. These cells are frequently referred to as interrupt cells since the inquiring device may, if the information read out from the cells applies to it, interrupt its own operation. If it does not apply, the contents of the interrupt cells may be returned as received from the specified memory location, i.e., the cells will be restored in their former state. However, if the information contained in the interrupt cells applies to the inquiring device, the cells are reset to a standard condition, e.g., to the "1" state, to await setting at some other time in accordance with some further event of which notification is to be given. As in the case of memory locations involving a read-alter-write operation, during the interval when a particular device has access to the interrupt cells, access to these cells must be denied to any other device seeking information contained in it in order not to give misinformation about the recorded event or events.

In prior art devices such lockout schemes are frequently costly to implement and they often have a tendency to deteriorate system performance. Prior art lockout systems may fail to discriminate between the various operations relative to a particular block. Thus, while a first device has access to a selected memory block, it may not be necessary to deny a second device access to the same block for a non-interferring use. For example, while a first device is carrying out a read-alter-write operation in a selected memory block, a non-altering read operation or normal write operation carried out simultaneously by another device in the same block may be permissible if it does not interfere with the first operation or give misinformation to the other device. To prevent the second device simultaneously carrying out such normal operations adds nothing to the security of the information stored in the selected memory block from an overall data processing system viewpoint, while slowing down and thereby degrading the performance of the overall data processing system.

OBJECTS OF THE INVENTION

Accordingly, it is the primary object of the present invention to provide apparatus for protecting the information stored in a selected block of a memory operating in a data processing system, by permitting the first device of the system to gain access to the selected memory block to retain possession thereof for the purpose of carrying out one of a plurality of specific operation sequences and denying other devices access to the memory block for the same purpose until the first device has relinquished possession.

It is another object of the present invention to protect the information stored in a selected block of a memory operating in a data processing system against being read and altered by a unique sequence of operations from other devices during the interval when a first device holds access to the selected memory block.

It is a further object of the present invention to prevent the information stored in a specified location of a memory operating in a data processing system from being read by a unique sequence of operations from another device while a first device holds access to that location.

These and other objects of the present invention together with the features and advantages thereof will become apparent from the following detailed specification and the description of a preferred embodiment of the invention, when considered in conjunction with the attached drawing in which the sole FIGURE illustrates in schematic form a preferred circuit for carrying out the present invention.

DESCRIPTION OF PREFERRED EMBODIMENT

The sole FIGURE illustrates in simplified schematic form a preferred embodiment for carrying out the present invention. The input signals received by the circuit shown in the sole FIGURE derive from whatever device is seeking access to the specified memory location. The instruction format of these signals, may be such that as to provide a set of command signals, "Commands Encoded," which specify the operation to be performed, as well as address signals, "Address Encoded." FIG. 1 shows the Commands Encoded signals as being applied to input terminals 7 of a decoder 10. A first pair of output lines 20 and 23 is coupled to one input each of a pair of OR gates 11 and 12 respectively. A second pair of output lines 31 and 32 of decoder 10 is coupled to another OR gate 13 whose output is applied to a remote register 17 by way of a line 34.

The output of OR gate 11 is coupled to input 25 of AND gate 15, as well as to the Set input of a lock flip flop 14. The output of gate 12 is coupled to the Reset input of the aforesaid flip flop 14, the latter providing output signals designated Lock and $\overline{\text{Lock}}$ in response to the application of signals of its Set and Reset inputs respectively. The Lock signal is applied to another input 26 of AND gate 15, as well as to the Start input of a timer 16. The latter further has a Reset input that receives the aforesaid $\overline{\text{Lock}}$ signal from the flip flop 14. The output of timer 16 is coupled to an input of the aforesaid OR gate 12. AND gate 15 further includes an output 22 which is adapted to provide an Abort signal.

The aforementioned Address Encoded signals received from the access-seeking device define both the address of the selected memory block as well as the specific memory location within such block. Further, for purposes of carrying out a designated unique sequence of operations, certain commands specifying the latter are encoded in the Address Encoded signal.

The signals representative of the latter commands are shown as being applied to inputs 8 of the remote register 17. The output of the remote register is coupled to a decoder 18. The outputs 21 and 24 of decoder 18 are applied to one input each of the aforesaid OR gates 11 and 12 respectively, as well as to a pair of inputs of another OR gate 19. The output of gate 19 is coupled to a special input 33 of an address register 30 of the type normally associated with the memory of a data processing system.

As shown in the sole FIGURE, the Address Encoded signal is applied to inputs 9 of the address register. The output of the latter register is decoded in decoder 35 and is applied to memory 36 of the associated data processing system so as to address the desired block and location in the latter.

The operation of the apparatus illustrated in the sole FIGURE will first be explained with respect to a read-alter-write operation to be carried out in a specified memory location, such as location 37 of memory 36. As previously explained, while such an operation is carried out by a first device, e.g., a CPU of the data processing system, it is important to deny access to the selected memory block in which the specified memory location resides to another CPU (or other device) seeking to carry out a similar operation.

As explained above the operation to be carried out is encoded in a set of signals applied to input terminal 7 of decoder 10 by the first CPU. During the read portion of the operation, the signal so applied is decoded to generate a unique signal, hereafter designated as the Read Lock signal, on output 20 of decoder 10. The signal so generated is applied to OR gate 11 and causes the lock flip flop 14 to be set. A corresponding Lock signal is provided at the output of the lock flip flop and is applied to the input 26 of AND gate 15. The output signal of OR gate 11 is further applied to one input of AND gate 15, but fails to render the latter conductive due to the delay inherent in lock flip flop 14 which prevents the Lock signal from being generated immediately and applied to AND gate 15 simultaneously with the output signal of OR gate 11. When generated, the Lock signal is applied to timer 16 to start the operation of the latter.

Simultaneously with the application of the Commands Encoded signal to decoder 10, an Address Encoded signal is applied to input 9 of address register 30 such that, upon decoding, the selected memory block 37 and the specified memory location within the block are addressed and the desired information is read out to the CPU which has access to memory block 37.

After the data read out from memory 36 has been processed in the CPU, the write portion of the operation sequence is initiated to write the modified (altered) data back into the specified memory location. At this time, the CPU again applies a Commands Encoded signal to input 7 of decoder 10 which causes the latter to generate an output signal on output 23, hereafter referred to as Write Unlock signal. The latter signal is applied to OR gate 12 and is effective to reset flip flop 14 so as to enable another CPU, or other device, to access the selected memory block. The resetting of flip flop 14 causes a $\overline{\text{Lock}}$ signal to be generated which is effective, in normal operation, to reset timer 16 prior to the point at which the timing cycle initiated by the Lock signal is completed. If the $\overline{\text{Lock}}$ signal is not derived before the timer 16 exceeds predetermined value, signal 39 is applied to OR gate 12, thereby presetting Lock flip flop 14 automatically. This timer function is necessary to surmount the condition of a CPU not being able to send the write portion of the sequence for various reasons (fault taken, hardware failure, etc.).

If another CPU seeks to carry out a read-alter-write operation in memory block 37 prior to the time that lock flip flop 14 is reset, the Commands Encoded signal and Address Encoded signal applied by such CPU to inputs 7 and 9 respectively will be substantially as described for the first CPU. As before, the application of such a signal to decoder 10 will cause a Read Lock signal to appear on the output 20, which is applied to input 25 of AND gate 15 by way of OR gate 11. Since the lock flip flop 14 is already in its set state as a consequence of the earlier application of a Read Lock signal derived from the first CPU, the new Read Lock signal will have no effect on flip flop 14. However, since a Lock signal is present on input 26 of AND gate 15, the application of the new Read Lock signal to input 25 will render the AND gate conductive. As a consequence, a signal is generated on output 22 which informs the second CPU that the attempted operation of read-alter-writing into a memory location in the selected memory block 37 has been aborted.

In essence, the second CPU is locked out from memory block 37 for purpose of the specific operation sequence (read-alter-write). It should be noted, however, that other operations by the second CPU, which do not have the effect of generating a Lock signal, are not precluded even in memory block 37.

As previously explained, in a data processing system it is necessary that the various devices of the system be notified of the occurrence of events of significance to them and, for such purpose, the system memory may be conveniently employed. In the present invention, the least significant memory address, i.e. memory location "0" is used to give notice of such events, such location being located in memory block 38. It should be noted that the selection of memory location "0" is a convenience only and that potentially any fixed memory location in any memory block may be forced into address register 30 by signal 33. The information recorded there, which must be protected, may for example give notice of the fact that a disk drive has completed its current operation. Such an event may or may not be of significance to one or more CPU's of the data processing system in question. In accordance with the present invention, a CPU addressing any location of the memory for the purpose of carrying out one of a plurality of predetermined unique sequences of operation receives information pertaining to the event in question by forcing it to address the "0" memory location where the event is recorded, instead of permitting such CPU to access the memory location originally addressed. The CPU thus forced to address the "0" memory location reads out the information stored in the interrupt cells. Up to 72 events may be recorded in memory location "0"; each type of event has its own cell. In the process, the contents of the interrupt cells are temporarily invalid such that the information stored there is misleading to the rest of the computer system for the time being. If upon examination of the data read out the CPU determines that such data is not of significance to it, the original information is restored to the interrupt cells (it is written back into the cells), which are then available for further examination by other devices of the data processing system seeking to access the memory for information pertaining to system events. If, however, the information read out is meaningful to the CPU, the latter will accept the information and respond by setting only those interrupt cells of significance to it to a standard condition. The latter prepares the interrupt cells for the receipt of information at some future time, upon the occurrence of another significant event that is to be recorded in the cells. The latter also permits the interrogation of the interrupt cells by another CPU for information significant to it.

It will be apparent from the foregoing explanation that access to the specified location, i.e., the interrupt cells, must be denied to other devices of the data processing system during the interval extending from the time that the contents of the cells are read out by the first CPU to the time that they are either restored to their original state, or reset to a standard condition. If other devices are not precluded from access during this interval, false or misleading information will be read out from the interrupt cells by such devices.

In accordance with the present invention such a lockout is implemented by denying access to the memory block that contains the interrupt cells to any other device during the aforesaid interval. A separate register 17, remote from the system memory, is employed and unique command codes, derived from the instruction issued by the device seeking to access the memory, are used to address the remote register in order to carry out unique operation sequences relative to the latter.

More specifically, the Commands Encoded signal derived from the device in question, e.g., the first CPU seeking access to the memory, is decoded by decoder 10 to obtain a Read Remote Register signal on output line 32 which is applied to OR gate 13. Simultaneously Address Encoded signals are applied to inputs 9 of address register 30, as well as to inputs 8 of remote register 17. As previously explained the signal applied to inputs 8 contains commands representative of the desired operation sequence to be carried out.

Upon energization from line 32, OR gate 13 provides a responsive output signal which is applied to a Latch input of remote register 17 by way of line 34. The result of so applying a Latch signal is to trap a subfield of the address applied by way of inputs 8 to remote register 17. The output of register 17 is decoded in decoder 18 and, during the read portion of the operation, a resultant output signal is provided on decoder output line 21. The latter signal, designated as the XEC Lock signal, is applied to an input of OR gate 11 and results in lock flip flop 14 being set. The XEC Lock signal is further applied to one input of an OR gate 19 to apply a responsive output signal to input 33 of address register 30.

As explained above, the address location addressed by the Address Encoded signal applied to inputs 9 of address register 30, may reside anywhere in memory 36, e.g., in memory block 37. However, the signal applied to address register 30 by way of input 33 forces the address register to "0" so as to address the least significant location of the memory where the interrupt cells are located. At this point the information stored in the interrupt cells is read out to the first CPU and the contents of the cells are temporarily altered.

During the write portion of the operation, the signal applied to input 7, upon being decoded, provides Write Remote Register signal on line 31 which is applied to OR gate 13. As before, the resultant output signal applied to remote register 17 via line 34 serves to latch the register, thereby trapping the Address Encoded signals simultaneously applied to inputs 8. The latter signal, upon being decoded in decoder 18, provides an output signal on line 24, designated as the SXC Unlock signal, which is applied to another input of the aforesaid OR gate 19. The SXC Unlock signal is further applied to an input of OR gate 12 so as to reset lock flip flop 14 and provide a $\overline{\text{Lock}}$ signal at the output of the latter.

The application of SXC Unlock signal to OR gate 19 causes a responsive output signal to be applied to address register 30 via input 33 which, as before, forces "0" in the address register. The resultant output signal of register 30, upon being decoded in decoder 35, thus addresses the "0" memory location of memory 36, either to write back the information previously readout from the interrupt cells, or to set the latter to a standard condition, as explained above.

If another device seeks to access memory block 38 during the interval when the first CPU has access to the interrupt cells for the purpose of carrying out a Read Remote Register/Write Remote Register sequence of operations an XEC Lock signal will be generated if such access to block 38 by such other device is sought for the purpose of carrying out one of the aforesaid unique operation sequences, i.e., Read Lock/Write Unlock or Read Remote Register/Write Remote Register. Upon application of the newly generated XEC Lock signal to OR gate 11, input 25 of AND gate 15 will be energized. With lock flip flop 14 in the Set state and input 26 also energized AND gate 15 will cause the latter to become conductive. The resultant output signal 22 advises the other access-seeking device that the desired operation has been aborted; i.e., it should try the sequence again.

From the foregoing description it will be clear that the present invention serves to protect the information in a selected block of memory against access by another device so as to prevent one or more of a plurality of predetermined unique operation sequences from being performed while the selected memory block is being accessed by a first device for a similar purpose. Because of the unique signals employed to designate the aforesaid operations sequences relative to which access may be denied, the present invention does not interfere with access to the same block of memory for purposes of carrying out permitted non-interfering operation sequences. Moreover, access to other memory blocks for any purpose and by any device is not precluded during the interval when the first device has access to the selected memory block. As a consequence, in accordance with the principles of the present invention, the protection of the desired information stored in the memory of the data processing system in question is accomplished without degrading the performance of the system.

Having thus described a preferred embodiment of the present invention, it will be apparent that numerous modifications and changes will now occur to those skilled in the art, all of which fall within the spirit of the scope of the invention as defined by the appended claims.

What is claimed is:

1. In a data processing system comprising at least one memory and a plurality of devices adapted to interact therewith, said memory being organized to store data in blocks each including a plurality of memory locations, address register means coupled to said memory for addressing a specified location in a selected block of said memory in accordance with address signals provided by any of said devices seeking access to said specified memory location;

apparatus for locking out another device seeking access to said selected block to prevent it from carrying out any of a plurality of predetermined, unique sequences of operations while a first device is still engaged in said selected block, comprising:

first decoding means for generating signals representative of Read Lock/Write Unlock and Read Remote Register/Write Remote Register operation sequences respectively, in accordance with command signals received from an access-seeking device, means for coupling a Read Lock signal to a first OR gating means, means for coupling a Write Unlock signal to a second OR gating means, means for coupling a Read Remote Register signal and a Write Remote Register signal respectively to a third OR gating means, a Lock flip-flop having Set and Reset inputs for generating Lock and $\overline{\text{Lock}}$ output signals in response to signals applied to its Set and Reset inputs respectively, AND gating means coupled to receive said Lock signal at one of its inputs, the output of said first OR gating means being coupled to another input of said AND gating means and to said flip-flop Set input, the output of said second OR gating means being coupled to said flip-flop Reset input, a timing circuit for initiating a predetermined timing cycle upon energization by said Lock signal, said timing circuit being reset upon the occurrence of said $\overline{\text{Lock}}$ signal, said timing circuit applying an output signal to said second OR gating means upon the completion of said timing cycle, a remote register energized by input signals derived from said address signals and latched by the output of said third OR gating means, second decoding means coupled to the output of said remote register for providing signals representative to an XEC Lock/SXC Unlock operation sequence in accordance with said input signals, means for coupling an XEC Lock signal to said first OR gating means and to a fourth OR gating means, means for coupling an SXC Unlock signal to said second and fourth OR gating means respectively, the output of said fourth OR gating means for forcing said address register means to address a predetermined memory location; whereby said AND gating means, when rendered conductive, provides an abort output signal which is coupled to said other device representing a command or notification to abort the operation sequence attempted by said other device in said selected memory block.

* * * * *